United States Patent
Bal et al.

[11] Patent Number: 5,913,728
[45] Date of Patent: Jun. 22, 1999

[54] CONTAINER, IN PARTICULAR FOR STAKING PLANTS

[76] Inventors: Patrick François Bal, 321, chemin de Charvinière F-38330, Saint-Ismier; Guy François Chanet, Le Donchet, F-73190 Saint-Jeoire, both of France

[21] Appl. No.: 08/894,005

[22] PCT Filed: Feb. 8, 1996

[86] PCT No.: PCT/FR96/00213

§ 371 Date: Aug. 11, 1997

§ 102(e) Date: Aug. 11, 1997

[87] PCT Pub. No.: WO96/25033

PCT Pub. Date: Aug. 22, 1996

[30] Foreign Application Priority Data

Feb. 13, 1995 [FR] France ...................................... 95 01612

[51] Int. Cl.[6] ........................... A01G 17/06; A01G 17/14
[52] U.S. Cl. ..................................................... 47/45; 47/47
[58] Field of Search ................................... 47/45, 44, 70, 47/46, 47

[56] References Cited

U.S. PATENT DOCUMENTS 3,264,783  8/1966  Bayliss ......................................... 47/45

5,179,799  1/1993  Hillestad ....................................... 47/45

FOREIGN PATENT DOCUMENTS

| 0317713A1 | 5/1989 | European Pat. Off. . |
| 0358565A2 | 3/1990 | European Pat. Off. . |
| 2533065 | 12/1976 | Germany . |
| 3400838 | 7/1985 | Germany . |
| 8631101 | 3/1987 | Germany . |
| 1452430 | 10/1976 | United Kingdom . |

*Primary Examiner*—Jack W. Lavinder
*Assistant Examiner*—Yvonne R. Abbott
*Attorney, Agent, or Firm*—Smith, Gambrell & Russell, LLP; Beveridge, DeGrandi, Weilacher & Young Intellectual Property Group

[57] ABSTRACT

A container, in particular for staking plants, including at least two coaxial ring-shaped members (2, 3) joined together via arms (5) hingedly connected thereto so that the members are mutually coaxially movable between a position in which they are folded flat and mutually adjacent, and an extended position in which the members are spaced apart as the arms are pivoted.

26 Claims, 10 Drawing Sheets

CONTAINER, IN PARTICULAR FOR STAKING PLANTS

The present invention concerns a container that can advantageously be used for staking plants and that is adapted to envelop the plant peripherally, in particular when the latter is in a pot.

The container of the invention comprises at least two coaxial annular members connected together by arms hinged to the members so that said members can be displaced coaxially relative to each other, at the same time as said arms change their orientation, between a folded position in which they are near each other and an extended position in which they are far from each other.

In one embodiment of the invention said arms comprise at least one part and the axial displacement of said members is produced by pivoting or tilting of said arms and rotation of said members relative to each other.

In another embodiment of the invention said arms comprise at least two parts hinged to each other and the axial displacement of said members relative to each other is produced by pivoting or tilting of said arms and translation of said members.

In accordance with the invention, the aforementioned parts of said arms are preferably connected by deformable connecting parts constituting hinges.

In a preferred embodiment of the invention said members and said arms are in one piece and said arms and said members are connected by deformable connecting parts constituting hinges.

In accordance with the invention, said members and said arms preferably have reciprocal holding parts that cooperate when said members are moved into the aforementioned extended position.

In accordance with the invention, the parts of said arms preferably have reciprocal holding parts that cooperate when said members are moved into the aforementioned extended position.

In accordance with the invention, said holding parts preferably comprise projecting parts or bosses which are formed on said members and/or said arms.

In accordance with the invention, said holding parts preferably comprise projecting parts or bosses which are formed on at least one of said parts of said arms.

In a preferred embodiment of the invention said members and said arms and/or said parts of said arms are respectively connected by hinge pins that extend parallel to the planes of said members and perpendicularly to said members and respectively comprise, in the vicinity of said hinge pins, projecting parts that extend parallel to the planes of said members and which are forced one over the other when said members and said arms and/or said parts of said arms move from their folded position to their extended position and/or vice versa, said projecting parts constituting holding parts.

In one variant of the invention, said projecting parts are respectively formed perpendicularly to said hinge pins.

In another variant of the invention, said projecting parts are respectively formed parallel to said hinge pins.

In a preferred embodiment of the invention, said members are disposed around and at a distance from each other and said arms extend between these members.

In a preferred embodiment of the invention, said members and said arms extend in substantially the same plane in the folded position.

In one embodiment of the invention, one of the members comprises parts enabling it to be coupled to the peripheral wall of a pot.

In accordance with the invention, said coupling parts preferably comprise outwardly deformable parts.

In another embodiment of the invention one of said members is an integral part of the peripheral wall of a pot.

In a preferred embodiment of the invention, the container is shaped so that it can be molded in the folded position.

The present invention will be better understood from a consideration of the containers for staking plants described by way of non-limiting example and shown in the drawings, in which.

FIGS. 1 through 4 show a container 1 which comprises three coaxial circular rings, namely a bottom ring 2, an intermediate ring 3 and a top ring 4, the rings being of substantially square section. The rings 2 and 3 are connected by four arms 5 regularly spaced around their periphery and the rings 3 and 4 are connected by four arms 6 regularly spaced around their periphery, these arms being of substantially square section. The ends of the arms 5 and the ends of the arms 6 are respectively connected to the rings 2 and 3 and to the rings 3 and 4 by hinges 7 with holding means, all of which are identical.

Figure 2:
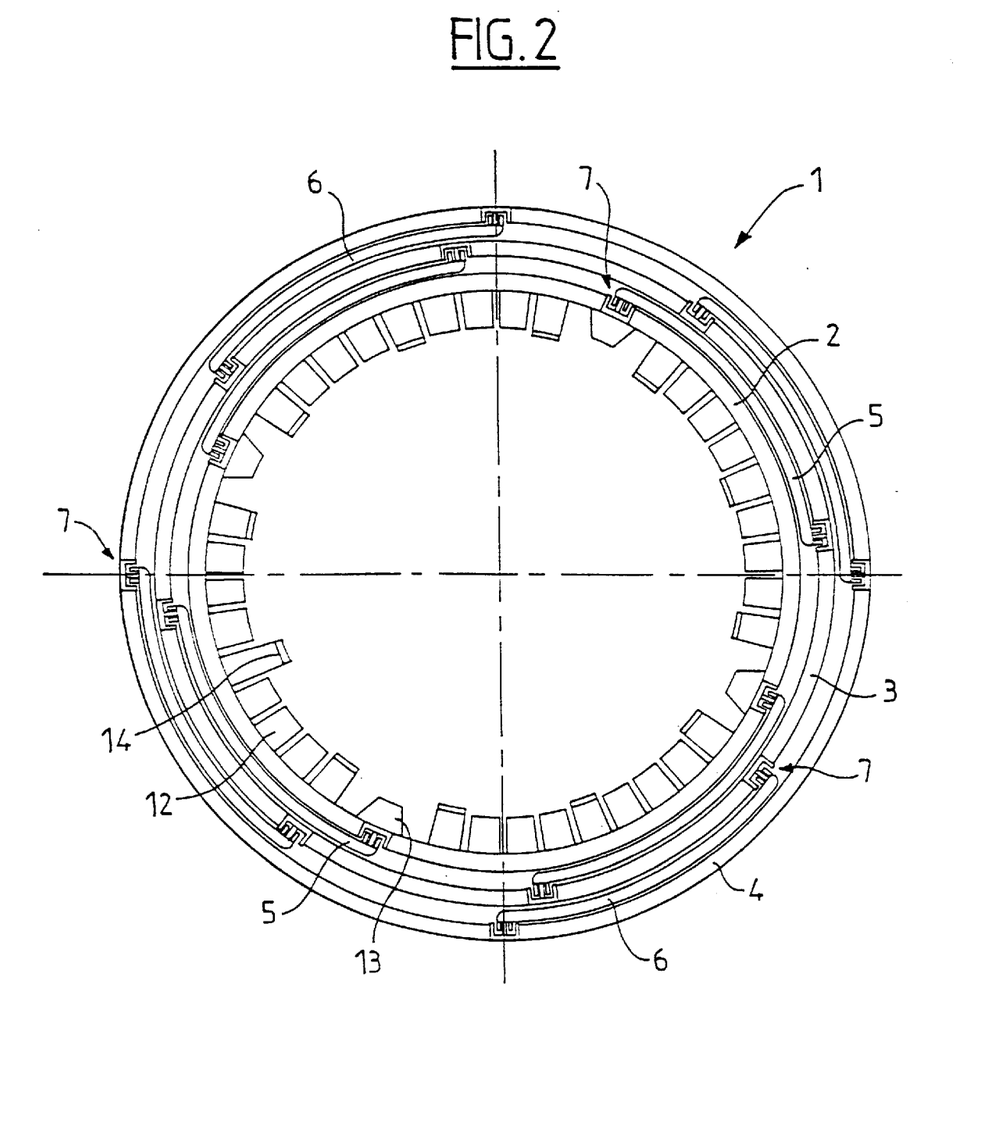
FIG. 2 represents a top view of the container from FIG. 1 in the folded position.
Figure 3:
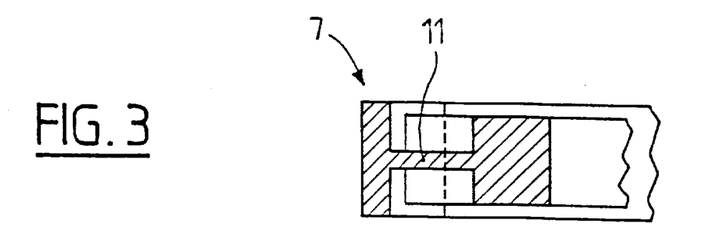
FIG. 3 represents a view to a larger scale of a hinge of the container from FIG. 1, in the folded position.

Referring to FIGS. 2 and 3 in particular, the disposition of the container 1 in the folded or flat position will now be described.

In this folded position, the rings 2, 3 and 4 lie in a common plane, the ring 3 lying between and at a distance from the bottom ring 2 which is inside it and the top ring 4 which is outside it.

The arms 5 extend between the ring 2 and the ring 3 and have an elongate circular arc shape and the arms 6 extend between the rings 3 and the ring 4 and have an elongate circular arc shape, the arms 5 in this example being at a small distance from the rings 2 and 3 and the arms 6 in this example being at a small distance from the rings 3 and 4.

The hinges 7 comprise notches 8 in the rings 2, 3 and 4 into which penetrate projecting parts 9 and 10 at the ends of the corresponding arms 5 and 6.

In the plane of the rings 2, 3 and 4 the notches 8 are U-shape and their walls are perpendicular to this plane. The projecting parts 9 and 10 have a rectangular section and are spaced from each other and from the walls of the notches and their walls are also perpendicular to this plane.

Between the projecting parts 9 and 10 and the arms 5 and 6, the hinges 8 have radial pins 11 which respectively connect the arms 5 and 6 to the bottoms of the notches 8 of the rings 2, 3 and 4.

The bottom ring 2 has on its interior side a multiplicity of tongues 12 that extend inwards and four tongues 13 at 90° to each other, some of the tongues 12 being longer and having at their end a projecting part or hook 14.

The container 1 just described can be manufactured in one piece, for example from a plastics material, when it is in its folded flat position as shown in FIGS. 2 and 3, in a waffle iron and between the two mold parts. In the folded or flat position all its walls are readily removable from the mold.

The container 1 made in this way can be mounted on the peripheral edge of a plant pot 15 in the following manner.

Figure 1:
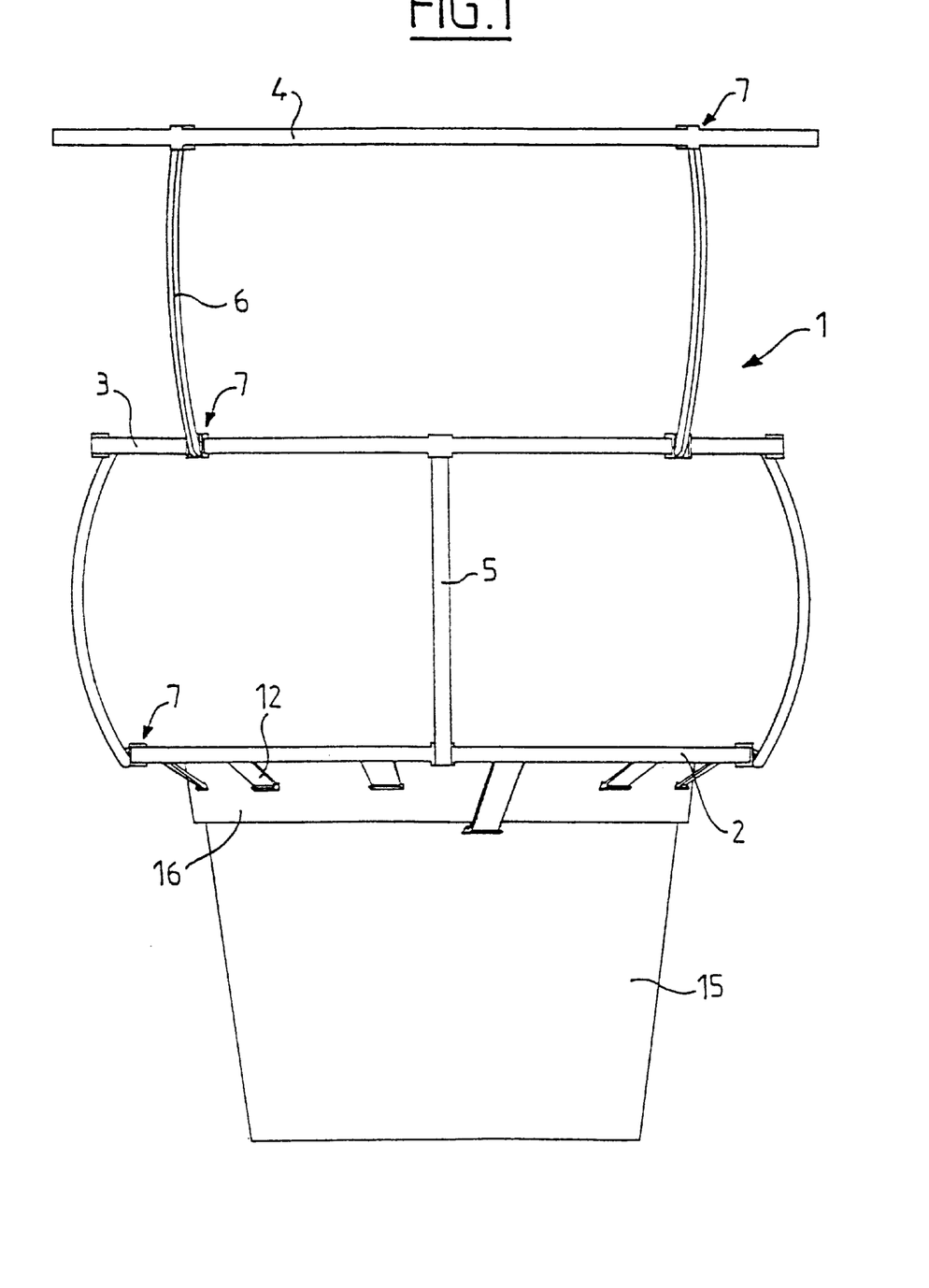
FIG. 1 represents an elevation view of a container of the invention, in the extended position, mounted on a pot.

The bottom part of a round pot 15 is inserted into the bottom ring 2 until the tongues 13 are above the rim of the pot, at which time the tongues 12 bear against the peripheral wall of the pot 15 and the hooks 14 on some of the tongues 12 engage under the projecting rim 16 of the pot 15. This holds the container 1 onto the pot 15.

The intermediate ring 3 and the top ring 4 are then moved axially upwards until the arms 5 and 6 are substantially vertical. This operation is effected by rotating the rings 2, 3 and 4 relative to each other in the direction that raises the arms 5 and 6 and by pivoting of the arms 5 and 6 relative to the rings 2, 3 and 4 that carry them by virtue of deformation of the hinge pins 11 of the hinges 7.

Figure 4:
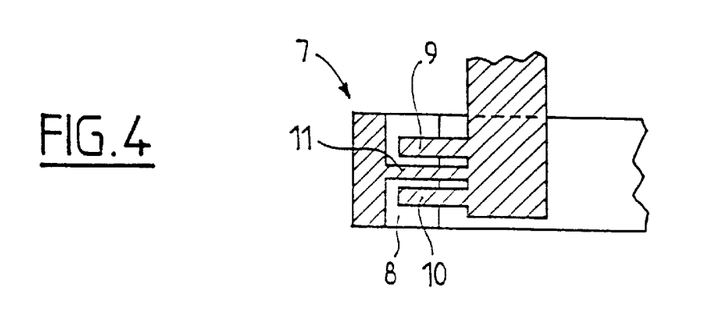
FIG. 4 represents a sectional view to a larger scale of a hinge of the container from FIG. 1, in the extended position.

During the above movements, the projecting parts 9 and 10 of the hinges 7 of the arms 5 and 6 strike the opposite faces of the notches 8 of the rings 2, 3 and 4 and are deformed so that at the end of travel they have moved into the plane of the rings 2, 3 and 4, as shown in FIG. 4. In this position, the opposite edges of the projecting parts 9 and 10 bear against the opposite walls of the notches 8 and hold the container 1 in its extended position shown in FIG. 1.

The intermediate ring 3 being therefore at a distance above the upper edge of the pot 15, this distance being determined by the length of the arms 5, and the top ring 4 being therefore at a distance above the intermediate ring 3, this distance being determined by the length of the arms 6, the rings 3 and 4 and the arms 5 and 6 determine a volume within which the plant in the pot 5, and in particular the lower peripheral part of the plant, can be held.

The container 1 is preferably installed on a pot 15 already containing a plant. Accordingly, the container 1 can constitute means of reducing the peripheral dimensions of a plant and of protecting it and can additionally be used for transporting it by holding one of the rings 3 or 4. By virtue of the tongues 13, the container 1 can be installed on pots 15 with different diameters.

If the hinge pins 11 of the hinges 7 are sufficiently strong, the container 1 can be folded up again and possibly reused.

The container 1 just described additionally has the advantage of being easy to manufacture by molding as previously described and can be stored before use in a folded flat position occupying a much smaller volume than its volume in the extended position.

Figure 5:
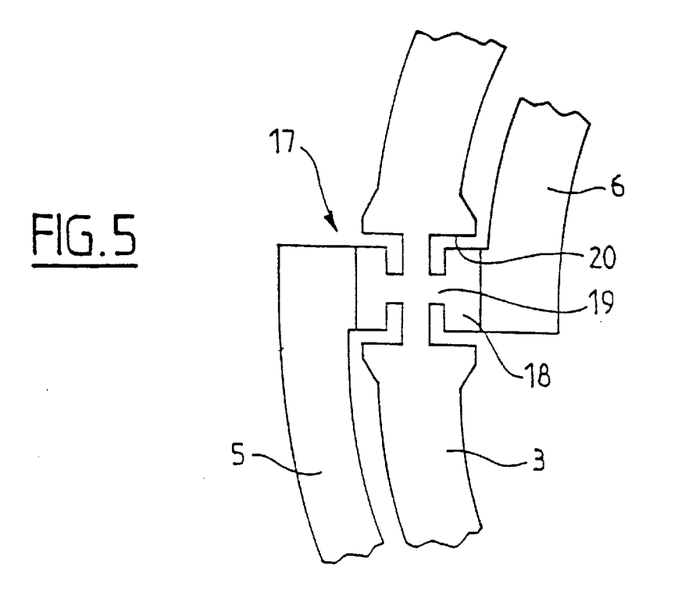
FIG. 5 represents a top view of a different embodiment of a hinge of the container from FIG. 1, in the folded position.

FIG. 5 shows a hinge 17 that can replace the hinges 7 previously described.

In this hinge 17, the projecting parts 9 and 10 previously provided are replaced by square section bosses 18 projecting from the ends of the arms 5 and 6, hinge pins 19 replacing the previous hinge pins 11 being formed between the bottom of U-shape notches 20 formed in the rings 2, 3 and 4 and the front face of the bosses 18. The dimensions of the bosses 18 are such that their corners strike and move beyond the opposite faces of the notches 20 when the arms are vertical in the extended position.

Figure 6:
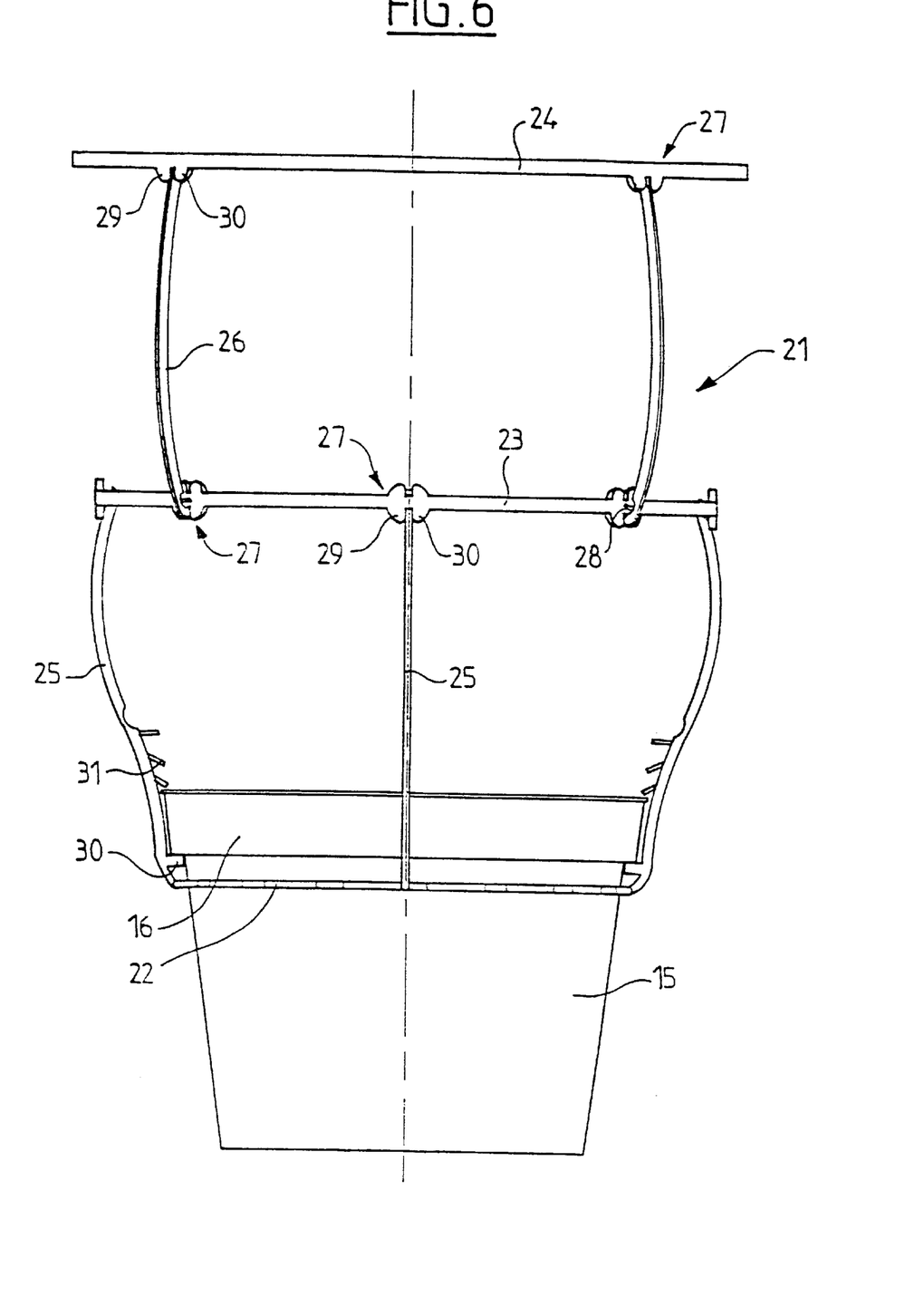
FIG. 6 represents an elevation view of a second container of the invention, in the extended position, mounted on a pot.
Figure 7:
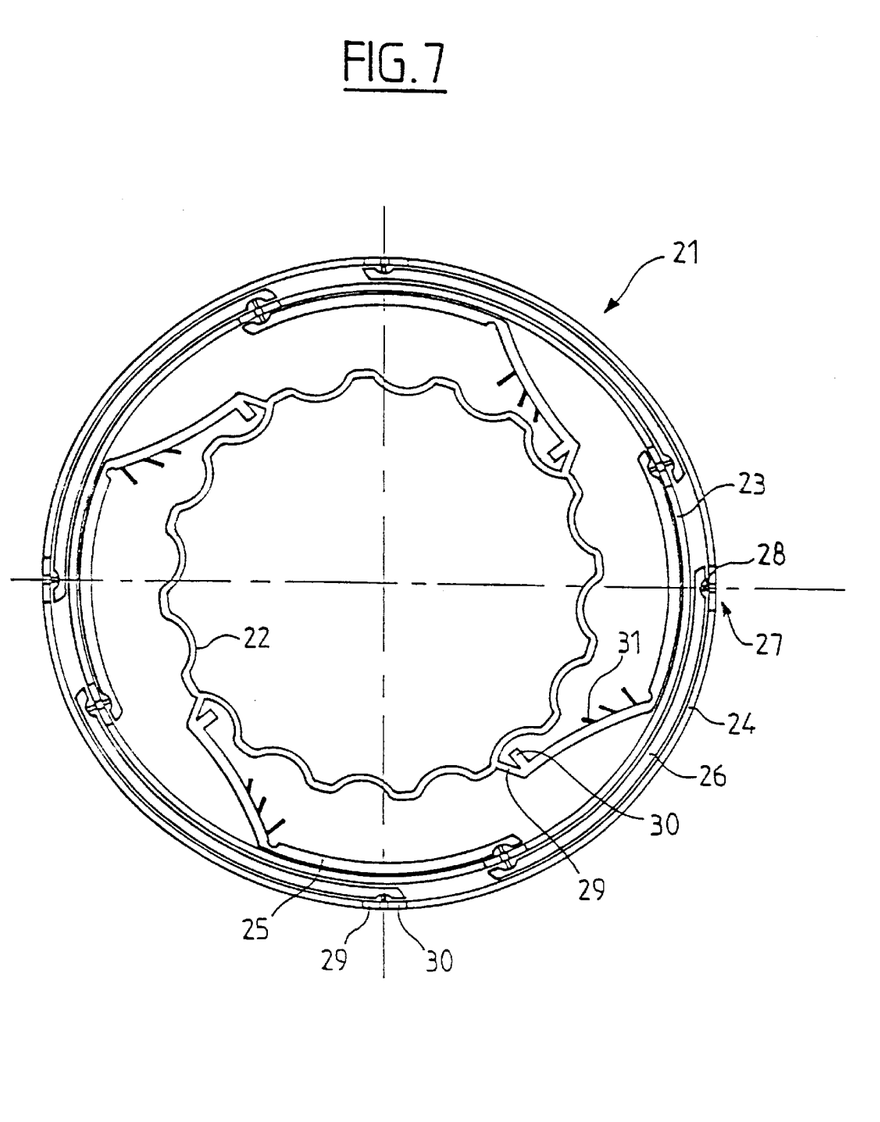
FIG. 7 represents a top view of the container from FIG. 2, in the folded position.

A container 21 that differs from the container 1 previously described principally in the structure of its hinges but which can be manufactured in the folded flat position as shown in FIG. 7 and used in the same manner will now be described with reference to FIGS. 6 through 8.

This container 21 comprises a corrugated bottom ring 22 adapted to envelop the periphery of a pot 15, adapting to its dimensions, a circular intermediate ring 23 and a circular top ring 24 together with four arms 25 that connect the ring 22 and the ring 23 and four arms 26 that connect the intermediate ring 23 and the top ring 24.

Figure 8:
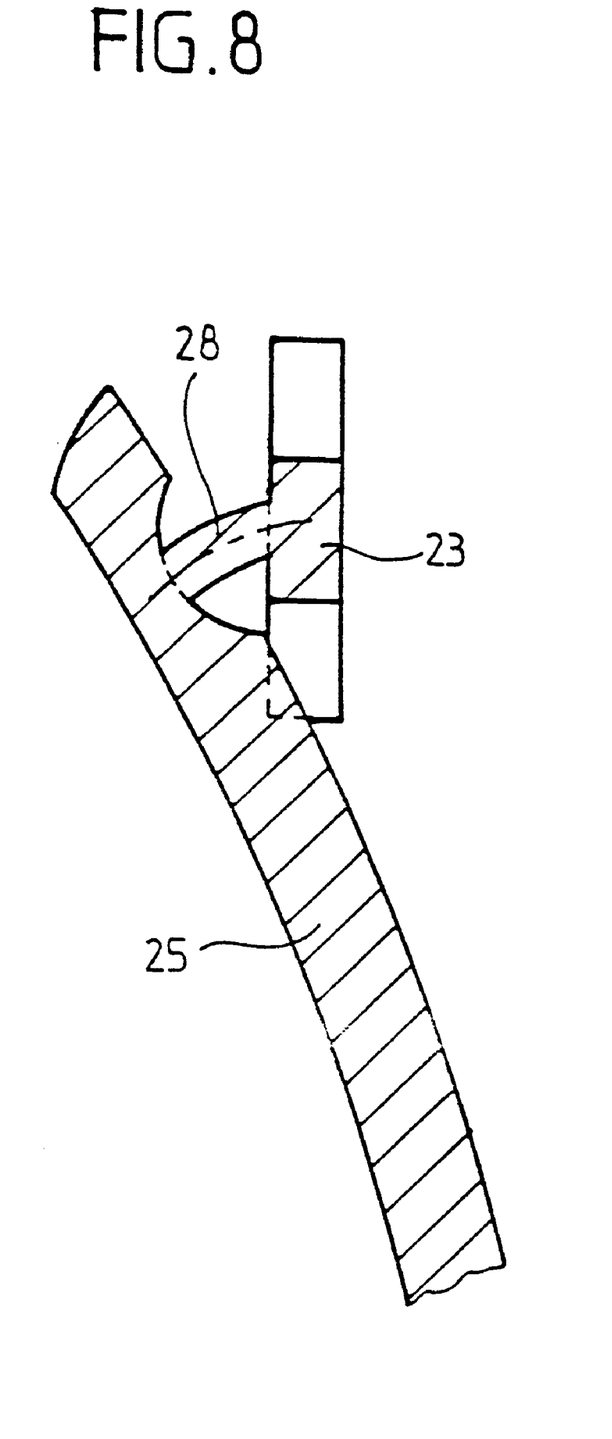
FIG. 8 represents a section of a hinge of the container from FIG. 6, in the extended position.

In this example, the hinges 27 respectively connecting the arms 25 and 26 to the rings 23 and 24 simply comprise radial hinge pins 28 and the rings 23 and 24 have bosses 29 and 30 perpendicular to their plane and between which the arms 25 and 26 can engage after passing beyond them, as shown in FIG. 6 and 8, when they are moved to the extended position, by virtue of the curvature of the arms 25 and 26.

The arms 25 are connected to the bottom ring 22 by hinge pins 29 and have bosses 30 adapted to bear on the bottom of the projecting peripheral part 16 of the pot 15 when they are moved to the extended position, these arms 25 also having bosses or tongues 31 adapted to engage over the top rim of the pot 15 when the container 21 is in its extended position, as shown in FIG. 6.

A container 32 provided permanently on a pot or rectangular trough 33 which has a projecting peripheral rim 34 will now be described with reference to FIGS. 9 through 11.

Figure 10:
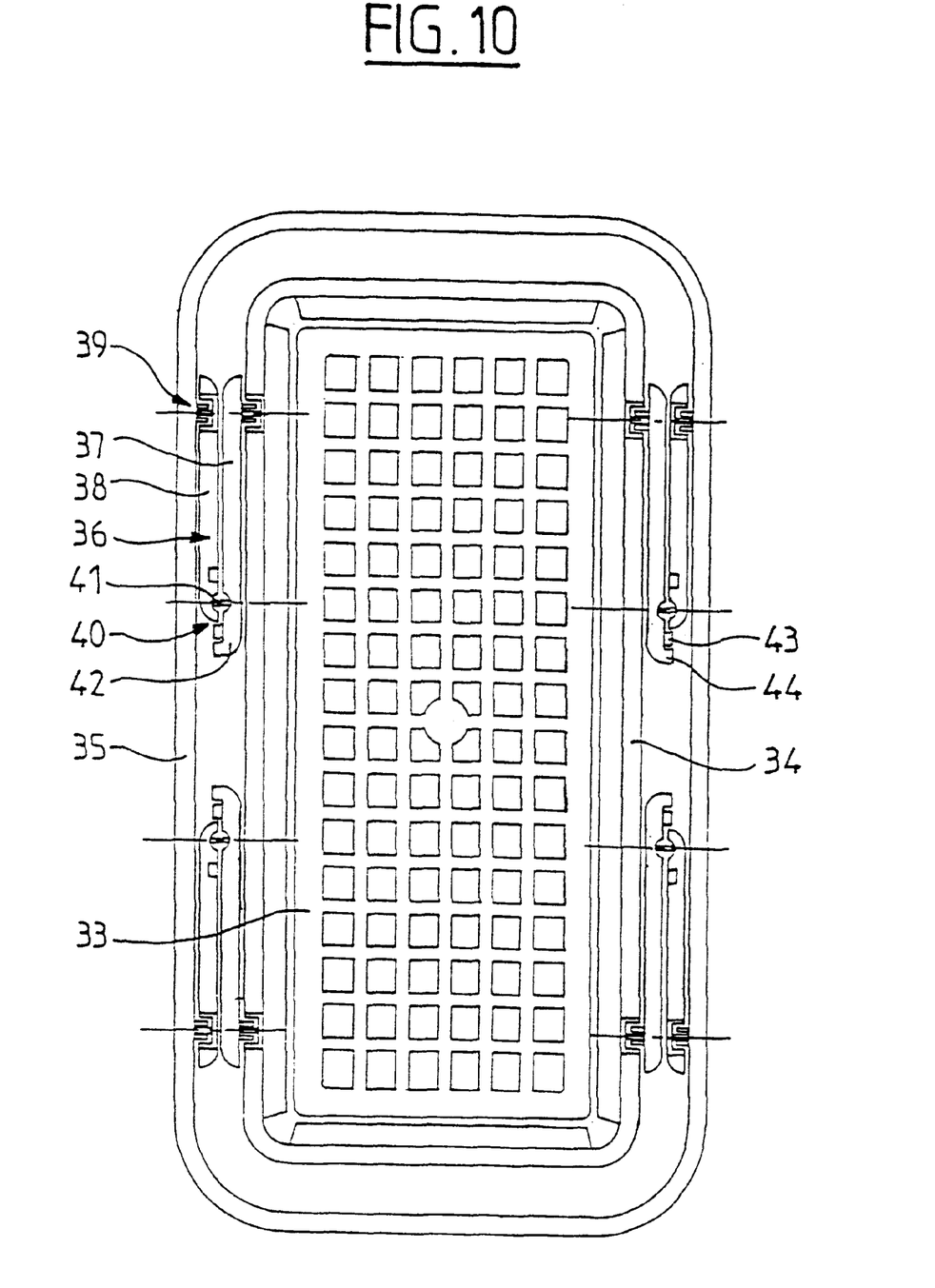
FIG. 10 represents a top view of the container from FIG. 9, in the folded position.

The container 32 comprises a rectangular ring 35 which, in the folded position, as shown in FIG. 10, extends around and at a distance from the peripheral ring 34 of the pot 33 and in the same plane, and four arms 36 which connect the rim 34 and the ring 35.

In this example, the arms 36 comprise two parts 37 and 38 which, in the folded position, as shown in FIG. 10, extend between the rim 34 of the pot 33 and the ring 35, alongside each other and at a distance from each other, and in the same plane as the rim 34 and the ring 35.

One end of the part 37 of the arms 36 and one end of the part 38 of the arms 36 are respectively connected to the rim 34 of the pot 33 and to the ring 35 by hinges 39 identical or symmetrical to the hinges 7 of the container 1 described with reference to FIGS. 1 through 4.

The other ends of the parts 37 and 38 of the arms 36 are connected together by hinges 40.

These hinges 40 comprise hinge pins 41 and the parts 37 of the arms 36 have extensions 42 which extend beyond the hinge pins 41 and which have bosses 43 and 44 at the same end as the parts 38 of the arms 36 and offset in the longitudinal direction of the parts 37.

In the example shown, two of the arms 36 are on one of the longer sides of the ring 35 and two on the other side.

Like the containers of the previous example, this container 32 can be molded in one piece in the folded flat position, as shown in FIG. 10, at the same time as the pot 33, the container 32 and the pot 15 being of a plastics material.

To extend the container 32 above the pot 33, in particular when the plants in the pot 33 are tall, it is sufficient to move the ring 35 upwards. When this is done the parts 37 and 38 of the arms 36 extend until they are in alignment, pivoting by deformation of the hinge pins of the hinges 39 connecting the parts 37 and 38 of the arms 36 to the rim 34 of the pot 33 and to the ring 35 and by deformation of the pins 41 of the hinges 40 connecting the parts 37 and 38 of the arms 36.

Figure 11:
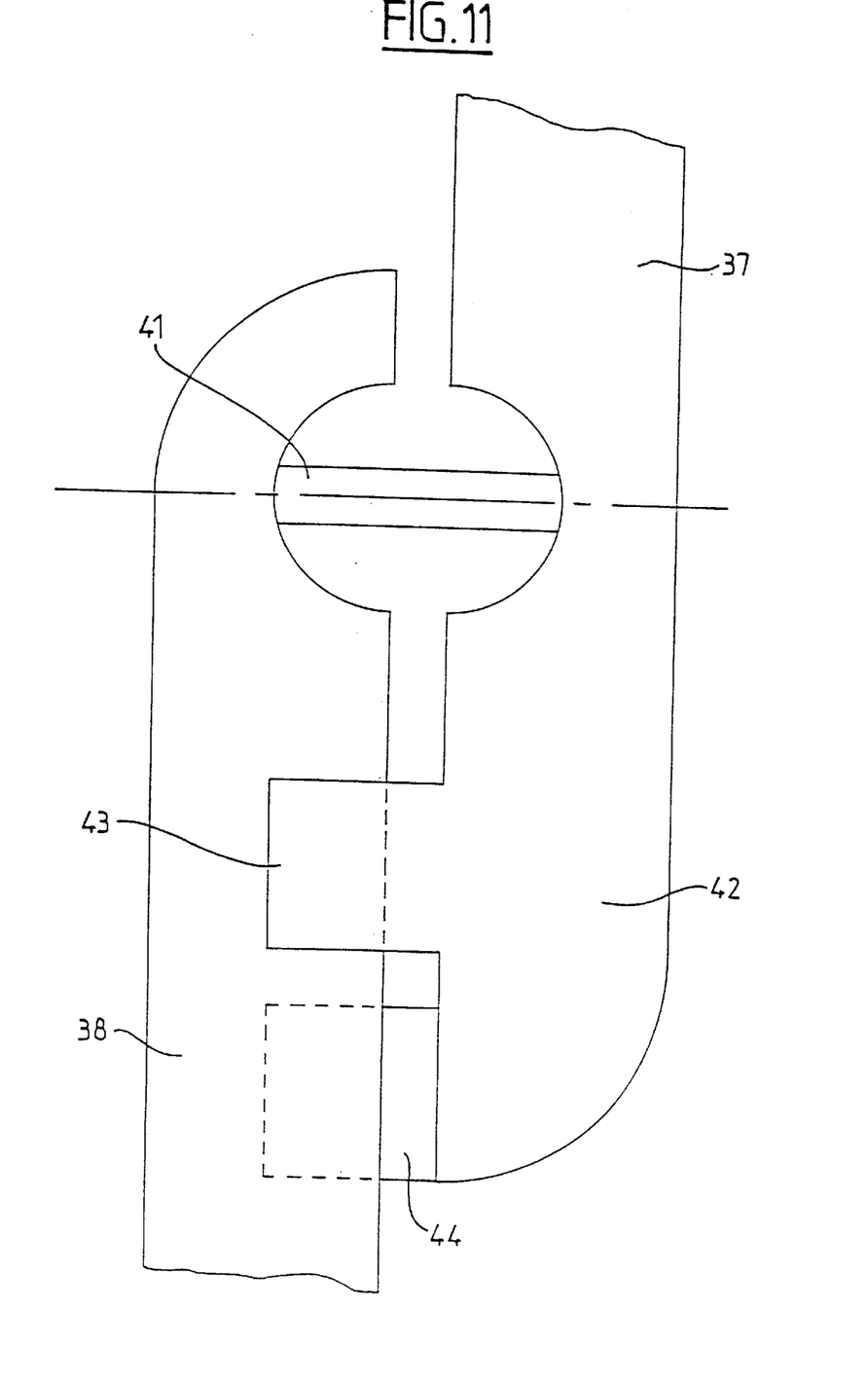
FIG. 11 represents a view to a larger scale of a hinge of the container from FIG. 9, in the extended position.

On reaching the folded position, the hinges 37 hold the arms 36 relative to the rim 34 of the pot 33 and relative to the ring 35, as in the example described with reference to FIGS. 1 through 4, and the two parts 37 and 38 of the arms 36 are held relative to each other by virtue of the fact that the parts 37 of the arms 36 are engaged between the bosses 43 and 44 on the extensions 42 of the parts 37 of the arms 36, as shown in FIG. 11.

Figure 9:
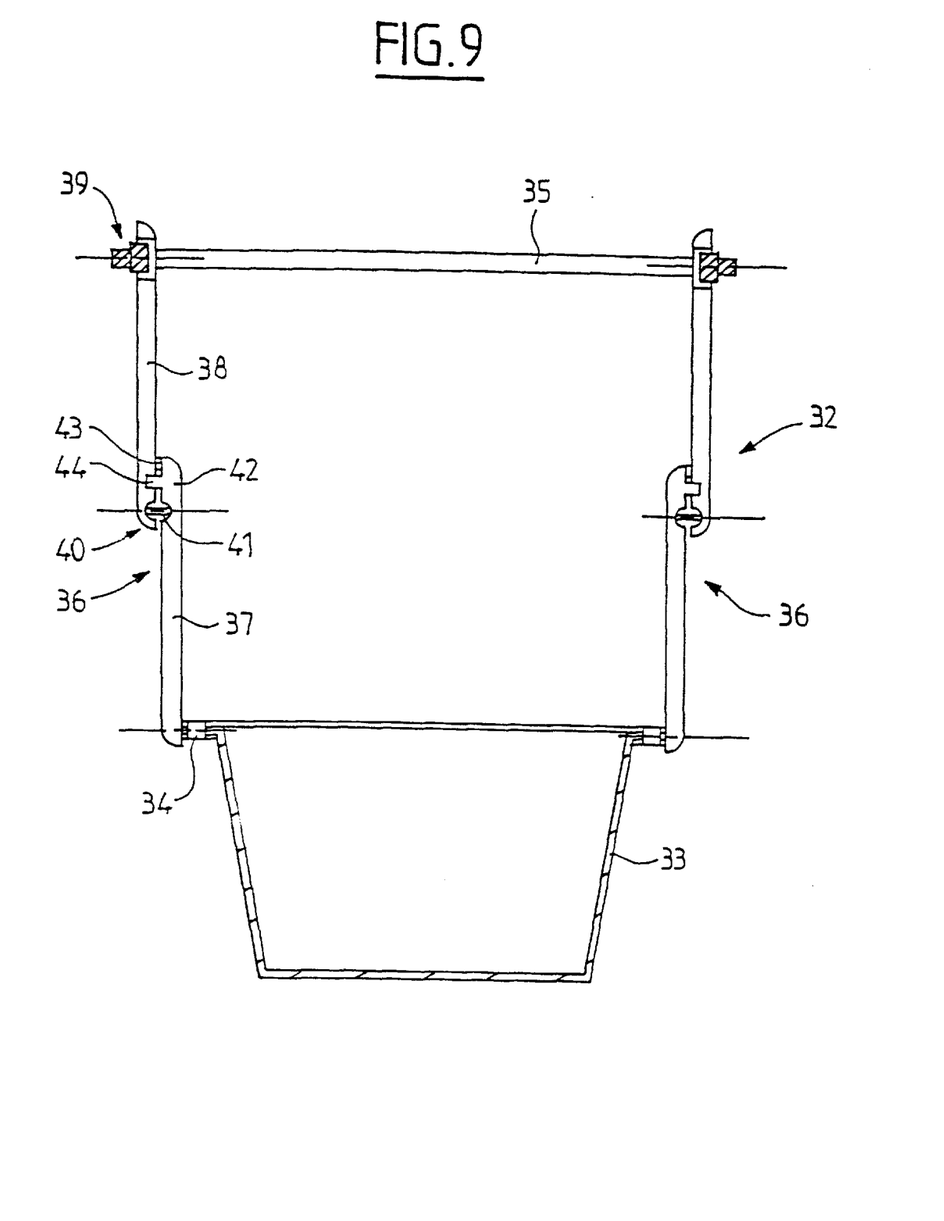
FIG. 9 represents a cross-section of a third container of the invention, associated with a pot, in the extended position.

Moved to the extended position, as shown in FIG. 9, the container 32 has the same advantages as the containers described in the previous example.

Of course, the container 32 could be independent of the pot 34 and could comprise a bottom ring connected to the arms 36 and this bottom ring could comprise means for fixing it to a rectangular pot, as in the previous example.

Figure 12:
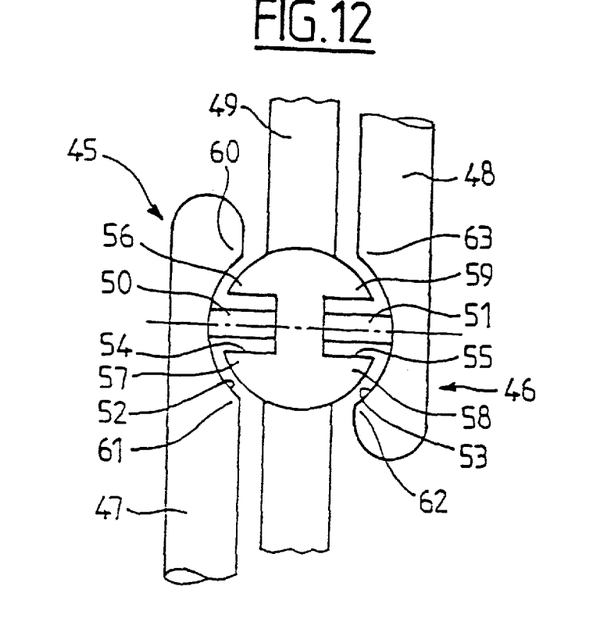
FIG. 12 represents a top view of a different embodiment of a hinge of the aforementioned container, in the folded position.
Figure 13:
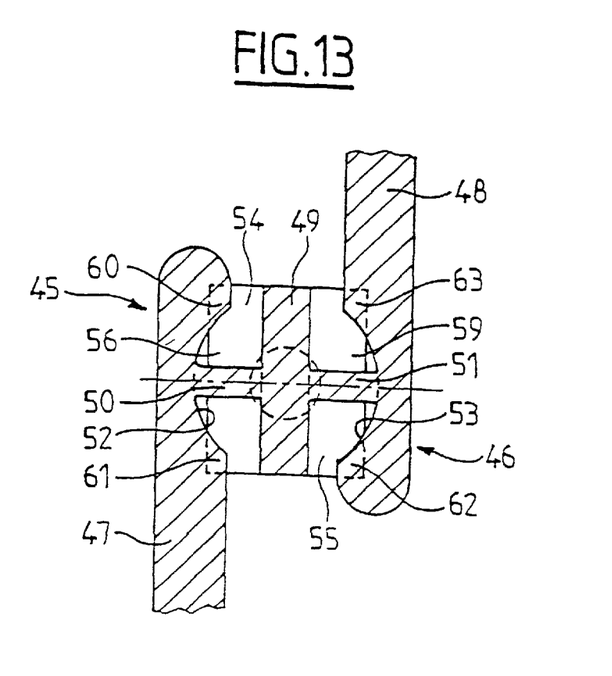
FIG. 13 represents a vertical section of the hinge from FIG. 12, in the extended position.

FIGS. 12 and 13 show two opposite hinge 45 and 46 of two opposite arms 47 and 48 on a ring 49 constituting another embodiment of the hinges previously described, the ring 49 and the arms 47 and 48 corresponding to the ring 3 and to the two arms 5 and 6 of the example described with reference to FIG. 1, for example.

In the folded position, the arms 47 and 48 extend on opposite sides of the ring 49 and in the extended position one extends upwards and the other downwards.

The hinges 45 and 46 comprise two opposite radial pins 50 and 51 that respectively connect the bottoms of two lateral grooves 52 and 53 of the arms 17 and 48 to the bottoms of two opposite lateral grooves 54 and 55 of the ring 49.

On either side of each of the opposed grooves 54 and 55 the ring has inwardly and outwardly projecting lateral parts or bosses 56, 57 and 58, 59 that extend vertically and the edges of the grooves 52 and 53 on either side of the pins 50 and 51, situated at a distance in the direction of the arms 47 and 48, constitute projecting parts or bosses 60, 61 and 62, 63.

In the folded position shown in FIG. 12, which corresponds to the injection molding position, the projecting parts 56 and 57 of the ring 49 enter the groove 52 on the arm 47, the projecting parts 60 and 61 of the arm 47 being outside the projecting parts 56 and 57 of the ring 49 in the peripheral direction of the latter and the projecting parts 58 and 59 of the ring 49 enter the groove 53 on the arm 48, the projecting parts 62 and 63 of the arm 47 being outside the projecting parts 58 and 59 of the ring 49 in the peripheral direction of the latter.

In the extended position shown in FIG. 13 the projecting parts 60 and 61 of the arm 47 enter the groove 54 of the ring 49, on either side of the pin 50, and the projecting parts 62 and 63 of the arm 48 enter the groove 55 of the ring 49, on either side of the pin 51. The arms 47 and 48 are therefore held in the extended position, their projecting parts 60, 61 and 62, 63 being respectively engaged between the projecting parts 56, 57 and 58, 59 of the ring 49.

When the arm 47 moves from its folded position to its extended position and vice versa, the projecting parts 60 and 61 of the arm are forced above the projecting parts 56 and 57 of the ring 49, in particular by deforming this arm, the pivot pin 50 twisting. When the arm 48 moves from its folded position to its extended position, the projecting parts 62 and 63 of this arm are forced above the projecting parts 58 and 59 of the ring 49, in particular by deforming this arm, the pivot pin 51 twisting.

Of course, if a ring 49 of a container like those previously described is connected at one place to only one arm 47 or 48, only one hinge 45 or 46 would have to be provided.

The present invention is not limited to the examples described hereinabove. Many variants are possible without departing from the scope defined by the accompanying claims.

We claim:

1. Container, in particular for staking plants, characterized in that it comprises at least two coaxial annular members (2, 3) connected together by arms (5) hinged to the members so that said members can be displaced coaxially relative to each other between a folded position in which they are near each other at the same time as said arms change their orientation, and an extended position in which they are far from each other.

2. Container according to claim 1 characterized in that said arms (5) comprise at least one part and the axial displacement of said members (2, 3) is produced by pivoting or tilting of said arms and rotation of said members relative to each other.

3. Container according to claim 1 characterized in that said arms (36) comprise at least two parts (37, 38) hinged to each other and the axial displacement of said members (34, 35) relative to each other is produced by pivoting or tilting of said arms and translation of said members.

4. Container according to claim 3 characterized in that the aforementioned parts of said arms are connected by deformable connecting parts (41) constituting hinges.

5. Container according to claim 3 characterized in that the parts of said arms have holding parts that cooperate to hold said members in the extended position when said members are moved into the aforementioned extended position.

6. Container according to claim 5 characterized in that said holding parts comprise projectiong parts or bosses.

7. Container according to claim 6 wherein said projecting parts or bosses comprise pairs of bosses longitudinally spaced apart on the parts of said arms.

8. Container according to claim 1 characterized in that said members and said arms are in one piece and said arms and said members are connected by deformable connecting parts constituting hinges (7, 39, 41).

9. Container according to claim 1 characterized in that said members and said arms have holding parts that cooperate to hold said members in the extended position when said members are moved into the aforementioned extended position.

10. Container according to claim 9 characterized in that said holding parts comprise projectiong parts or bosses.

11. Container according to claim 10 wherein said projecting parts or bosses are formed on said arms and engage engaging holding parts of said members.

12. Container according to claim 1 characterized in that said members and said arms are respectively connected by hinge pins which hinge pins define an axis of rotation that extends parallel to a plane represented by substantially common level surfaces assumed by said members when in the folded position and which axis of rotation of said hinge pins extends perpendicularly to a direction of elongation of a respective one of said arms, and wherein said container includes projecting parts which are positioned so as to be forced one over the other when said members and said arms move from their folded position to their extended position, and, when in the extended position, said projecting parts constitute holding parts which hold said container in said extended position.

13. Container according to claim 12 characterized in that said projecting parts are respectively formed perpendicularly to the axis of rotation of an adjacent one of said hinge pins.

14. Container according to claim 12 characterized in that said projecting parts are respectively formed parallel to the axis of rotation of an adjacent one of said hinge pins.

15. Container according to claim 1 characterized in that said members (2, 3) are disposed around and at a distance from each other and said arms (5) extend between these members.

16. Container according to claim 1 characterized in that said members and said arms extend in substantially the same plane in the folded position.

17. Container according to claim 1 characterized in that one of the members comprises parts (12) enabling it to be coupled to the peripheral wall of a pot.

18. Container according to claim 15 characterized in that said coupling parts (12) preferably comprise outwardly deformable parts.

19. Container according to claim 1 characterized in that one of said members (34) is an integral part of the peripheral wall of a pot.

20. Container according to claim 1 characterized in that it is shaped so that it can be molded in the folded position.

21. Container according to claim 1 wherein said members and said arms are respectively connected by hinges.

22. Container according to claim 21 wherein said hinges are deformable plastic hinge pins and said hinges include holding parts for holding said arms and members in the extended position which holding parts include contact or striking walls defining notches in said members and bosses on said arms which are received in said notches.

23. Container according to claim 21 wherein said arms comprise at least two arm parts which are each hinged to each other with an arm hinge.

24. Container according to claim 23 where said hinge connecting said arms and members together and said arm hinges connecting said at least two parts of said arms are formed by deformable, plastic hinge pins.

25. Container according to claim 1 wherein said container is formed as one piece.

26. Container according to claim 25 wherein said one piece is a molded plastic piece.

* * * * *